United States Patent [19]
Devitt et al.

[11] Patent Number: 5,488,771
[45] Date of Patent: Feb. 6, 1996

[54] METHOD FOR MANUFACTURING EXTERNALLY PRESSURIZED BEARING ASSEMBLIES

[75] Inventors: Andrew J. Devitt, Media, Pa.; Alex Slocum, Concord, N.H.

[73] Assignee: Advanced Engineering Systems, Operations & Products Inc., Concord, N.H.

[21] Appl. No.: 208,650

[22] Filed: Mar. 9, 1994

[51] Int. Cl.[6] ............................. F16C 33/14; B23P 11/00
[52] U.S. Cl. ........................ 29/898.02; 29/460; 29/559; 29/898.03
[58] Field of Search ................... 29/458, 460, 527.2, 29/898.02, 898.03, 898.1, 423, 559; 156/285, 287; 384/12, 13, 100, 114; 269/21

[56] References Cited

U.S. PATENT DOCUMENTS

| | | | |
|---|---|---|---|
| 3,359,613 | 12/1967 | Rye | 29/898.02 |
| 4,571,799 | 2/1986 | Chitayat | 29/898.02 |
| 4,626,299 | 12/1986 | Knight et al. | 156/71 |
| 4,863,149 | 9/1989 | Luther et al. | 269/8 |
| 4,970,773 | 11/1990 | Buchler | 29/407 |
| 5,065,489 | 11/1991 | Mullen et al. | 29/281.5 |
| 5,102,235 | 4/1992 | Mugglestone | 384/45 |
| 5,104,237 | 4/1992 | Slocum | 29/898.02 X |

FOREIGN PATENT DOCUMENTS

| | | | |
|---|---|---|---|
| 58-186541 | 10/1983 | Japan | 29/898.03 |

*Primary Examiner*—S. Thomas Hughes
*Attorney, Agent, or Firm*—Rines & Rines

[57] ABSTRACT

A novel means for manufacturing a precision linear or rotary motion system that is comprised of one or a set of precision machine bearing rails (i.e., long straight and parallel surfaces, or a single straight shaft), precision manufactured modular bearing pads, and a carriage or housing that surrounds the bearing pads when they are placed onto the rails and held in place by placing a vacuum on the port normally used to supply pressurized lubricant to the bearing rails, but leaves a gap between the rough surface of the housing or the carriage and the backsides of the bearing pads, into which gap a stable epoxy is injected to fill the gap between the backs of the bearing pads and the inner rough surface of the carriage. These goals are achieved first by designing the bearing rails or shaft to have the required straightness and parallelism tolerance, and the carriage or housing to have the required stiffness, such that when the bearing pads are epoxy-potted in-place and the external pressure source for the lubricant is turned on, the system expands enough to provide a sufficient and even fluid or gas film between the bearing pad surface and the rails or shaft as the carriage or housing moves through its complete range of motion with respect to the shaft. Alternatively, thin shim stock with holes in it (e.g., 10 micron thick) can be placed between one or more of the bearing pads and the rail prior to turning on the vacuum. After the epoxy is injected and cured, the shim stock is easily removed when the pressure is turned on.

4 Claims, 3 Drawing Sheets

METHOD FOR MANUFACTURING EXTERNALLY PRESSURIZED BEARING ASSEMBLIES

The present invention relates to methods for manufacturing externally pressurized bearing assemblies and the like, and with far greater ease than has been possible in the past requiring only the bearing rails and the bearing pads to be precisely machined: The carriage that rides on the rails can, with the invention, have rough machined surfaces to which the bearings which support the carriage are attached, as by means of a special epoxy potting process, instead of the precision machining previously required to ensure that the bearings were precisely aligned and located with respect to the bearing rails.

BACKGROUND

Externally pressurized bearings include porous carbon, orifice, and step compensated air bearings and orifice, self, diaphragm or other similarly compensated fluid bearings. All these bearings have several things in common and that include: the presence of a pocket region (either large or tiny as in the case of porous graphite) that is connected to an external supply line; the presence of a supply line that connects the bearing up to an external pressure supply; the need to be located with respect to the bearing rail or shaft that they will ride on with great precision; a carriage or housing that they are supposed to support with respect to the housing.

In the past, the surfaces on the carriage that the bearings were attached to were often precision machined such that when the bearing pads were attached to them, the entire assembly could be slid over the bearing rails or a shaft inserted. Needless to say, this was very expensive, and required that every rail assembly be carefully measured, and then a carriage carefully machined and fitted to the rail assembly, so each system was comprised of a matched set.

An alternative means was to use a rough machined carriage that used set screws to push against the backs of the bearing pads which forced them into contact with the bearing rail or shaft. Epoxy was then injected into the gap between the backs of the bearing pads and the rough inner surfaces of the carriage or housing. This method had one serious drawback. The set screws force caused local depressions in the geometry of the bearing pad that caused the bearing gap to be uneven, thereby increasing the sensitivity to a changing gap caused by tolerance errors in the bearing rail or shaft geometry and mounting. This increased the likelihood of a "crash" once the machine became operational. In addition, for ceramic structures, where it is expensive and undesirable to have stress concentrating holes, or in some types of housings, the auxiliary holes produced by this method are unacceptable. In the event that a thick enough bearing pad or enough set screws were used to avoid deforming the pad, desirable results were obtained, but at increased cost.

Other techniques have been proposed to develop a good joint between a bearing block that is in contact with a bearing rail, and a structure. Devitt Machinery of Aston Pa. and Philadelphia Resins of Montgomery Pa. have for many years sold special epoxies that are designed not to shrink and that fill the gap between a bearing block and a structure. The process is commonly used with a linear-guide type bearing, such as shown in U.S. Pat. No. 5,102,235 of common assignee herewith. Matching parallel rails are bolted to a machine bed and carriages are attached to each of the rails. With this design, a carriage would be positioned over the bearing blocks, and then a high effective viscosity non-Newtonian epoxy is injected into the space between the tops of the bearing blocks and the rough underside of the carriage. In this manner, the carriage may be aligned with respect to the bearings and secured in place without requiring any precision machining of the carriage-to-bearing mounting surface. Set screws are typically used to adjust the carriage position prior to injecting the epoxy.

U.S. Pat. No. 4,626,299 of Knight et. al. describes a similar means for attaching guideways to a machine tool bed, filling the space between them and the machine tool with bonding material, although as shown has been done also by others in everyday practice. In U.S. Pat. No. 4,726,103 a system bolts together components and positions them with set screws and then injects the epoxy.

One other variation of the idea, discussed in U.S. Pat. No. 4,863,149, uses a complex assembly fixture that has "arms" which position/hold tapered gib plates in position within the roller-ball cavities of an upside-down carriage while the epoxy is poured. The fixture has electromagnets that hold the gib plates to its "arms" while the arms are extended into the cavities. After the epoxy hardens, the magnets are released and the fixture "arms" are withdrawn. The gib plates are tapered and located within the bearing cavities, with bearing assemblies that are angled in a reverse-direction to slip into these cavities. Because of the opposing tapers, the depth at which the bearing assemblies sit (and thus their pre-load) can be adjusted by moving the bearing longitudinally within the cavity. A screw assembly is included along the longitudinal axis of each design.

Other applications of manufacture may be represented by U.S. Pat. No. 4,970,773 describing a method/apparatus for locating operational surfaces on a Mag-Lev Train. It could be viewed as analogous to attaching a long rail in proper position to a structure with respect to the train with the side rails being held in place by a fixture and a space existing between the inside of the side rail and the outside of the track being filled with concrete. Another similar patent is U.S. Pat. No. 5,065,489 which applies to multiple pieces in a copier machine; the pieces must be in good alignment to fit. During service of the machine, they are removed and must be realigned to facilitate reassembly. An "aligning member" is slipped over the already installed and aligned components, forming a cavity between the aligned components and the inside of the member, and the cavity is filled with adhesive, thereby making one integrated piece that can be removed and reinstalled easily since the adhesive holds the parts in the same relative position as when the adhesive was injected. Returning to bearing manufacture, the bearing manufacturing systems described in the preceding patents address methods for manufacturing rolling element bearing-based machines. These are, however, very different functionally and manufacturing-wise from the externally pressurized bearing assemblies of the present invention in which the flow through a hydrostatic bearing is reversed in order to hold it accurately in place against the bearing rail, and then the bearing is potted in place with epoxy. Upon restoring positive pressure, the bearing will then function normally. The vacuum method described herein provides indeed the highest level of even distributed force to attract the bearing surface to the bearing rail. This results in an exact matching of the surfaces in a low stress manner which helps to ensure the attainment of accuracy and long term stability.

OBJECT OF THE INVENTION

Accordingly, it is an object of the present invention to provide a new and improved method for manufacturing a precision linear or rotary motion system that does not require precision machining of all parts, but only of the bearing rails (i.e., long straight and parallel surfaces, or a single straight shaft), and modular bearing pads.

A further object is to provide such a method that automatically ensures precise alignment and location of the bearings with respect to the bearing rails.

Further objects are addressed hereinafter and are more particularly delineated in the appended claims.

SUMMARY

In summary, the invention embraces a method for manufacturing a precision linear or rotary motion system using pressurized fluid bearings and comprised of one or a set of precision machine bearing rails, precision manufactured modular bearing pads and a carriage/housing with rough inner surfaces that surround the bearing pads as placed on the rails, that comprises putting the bearing pads in place inner side down on the rails; applying vacuum where the pressurized fluid is normally applied to the bearing rails to hold the bearing pads flat in their desired places while leaving a gap between rough surfaces of the carriage/ housing and the outer sides of the bearing pads; injecting a stable epoxy to fill said gap between the outer sides of the bearing pads and the inner rough surfaces of the carriage to pot the bearing pads in precisely aligned place; and withdrawing the vacuum and applying the pressurized bearing fluid between the inner sides of the bearing pads and the rails to provide an operating fluid film therebetween.

Preferred and best mode embodiments are hereinafter described.

DRAWINGS

The invention will now be described with reference to the accompanying drawing in which.

DESCRIPTION OF THE INVENTION

In general, a precision motion system is manufactured from a set of precision machine bearing rails (i.e., long straight and parallel surfaces, or a single straight shaft), precision manufactured modular bearing pads, and a carriage or housing, the rough inner surfaces of which surround the bearing pads when they are placed onto the rails and held in place by placing a vacuum on the port normally used to supply pressurized lubricant to the bearing rails. A gap is left between the rough surface of the housing or the carriage and the backsides of the bearing pads, into which gap a stable epoxy is injected to fill the gap between the backs of the bearing pads and the inner rough surface of the carriage. The assembly is made by machining the bearing rails or shaft to have the required straightness and parallelism tolerance, and the carriage or housing to have the required stiffness, such that when the bearing pads are epoxy-potted in-place and the external pressure source for the lubricant is turned on, the system expands enough to provide a sufficient and even fluid or gas film between the bearing pad surface and the rails or shaft as the carriage or housing moves through its complete range of motion with respect to the shaft. Alternatively, thin shim stock with holes in it (e.g., 10 micron thick) can be placed between one or more of the bearing pads and the rail prior to turning on the vacuum. After the epoxy is injected and cured, the shim stock is easily removed when the pressure is turned on.

Figure 1:
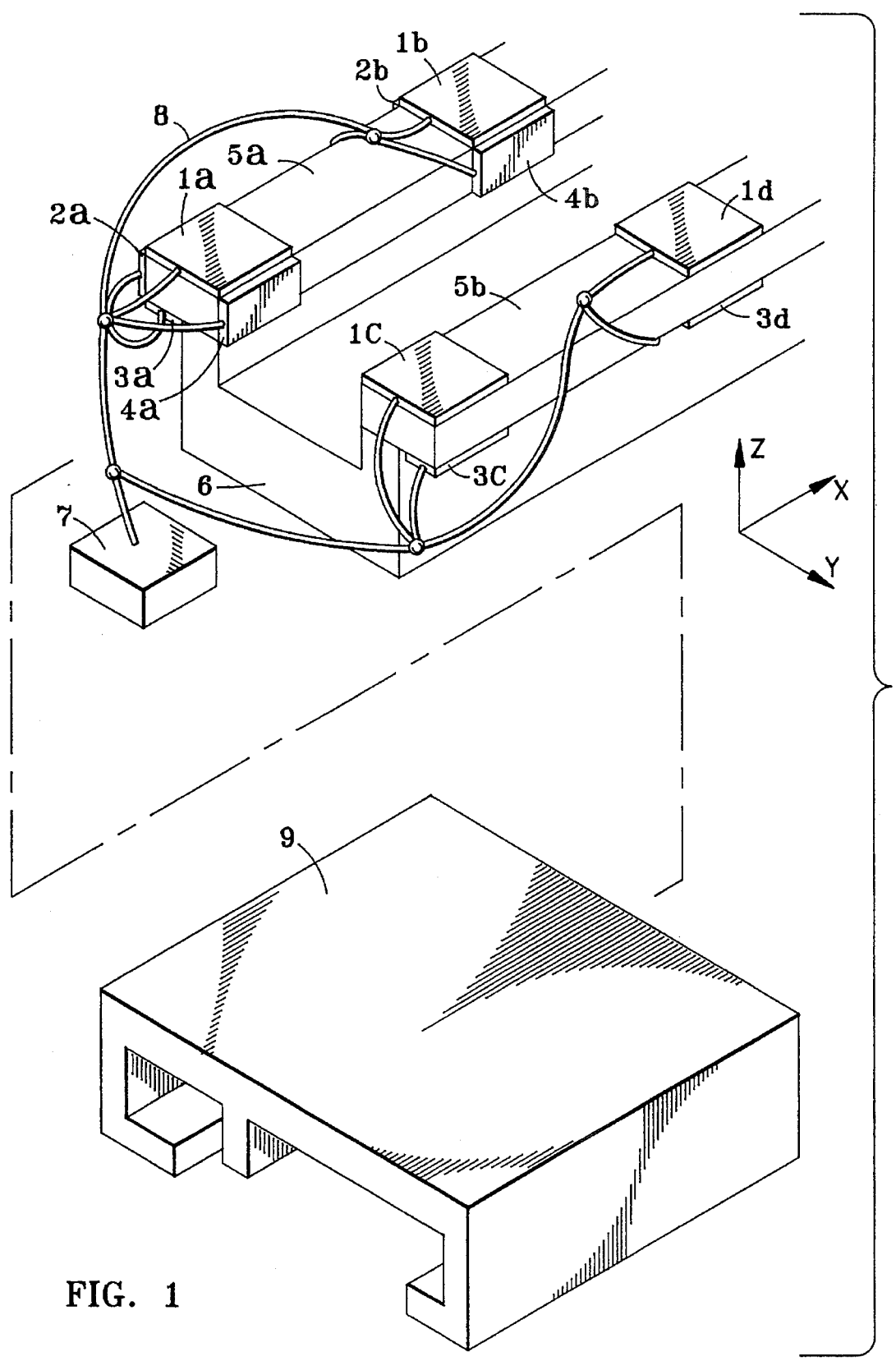
FIG. 1 is an isometric view of a typical bearing rail system with modular bearing pads held to the rails by vacuum means prior to the carriage being positioned over the system and injection of the epoxy.

For application to linear motion systems, FIG. 1 shows a machine bed 6 with precision bearing rails 5a and 5b attached to it by bolts or other means (e.g., the rails could be an integral part of the bed). A carriage 9 is to be supported in the Z direction by modular hydrostatic bearing pad pairs 1a and 3a and 1b and 3b, which ride on rail 5a, and 1c and 3c, and 1d and 3d which ride on rail 5b. Carriage 9 is to be supported in the Y direction by modular hydrostatic bearing pad pairs 2a and 4a and 2b and 4b, which ride on rail 5a. The bearing pads are held to the rails with the use of a vacuum system that is connected to the pads by a system of hoses 8.

Figure 3:
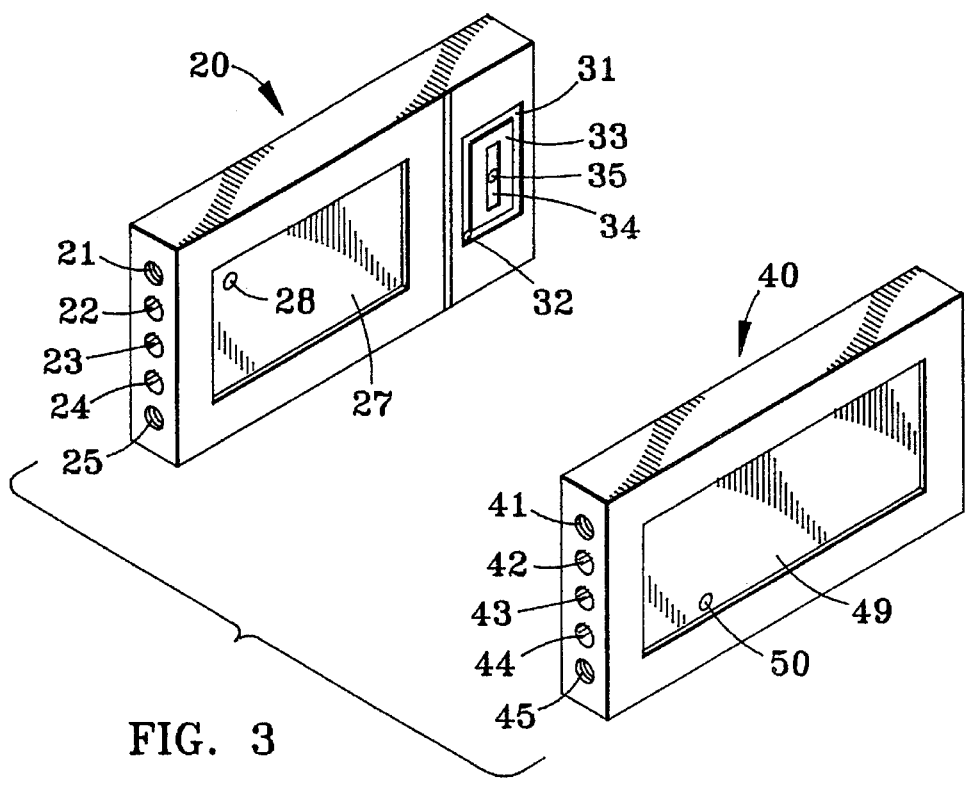
FIG. 3 is an isometric view of two opposed bearing pads as they would be configured around a bearing rail (not shown for clarity) just prior to being sucked down to the rail with a vacuum.

FIG. 3 shows in greater detail the typical configuration of the pads. Here, modular self compensating bearing pads 20 and 40 are used as described for example in U.S. Pat. No. 5,104,237. Holes 21 and 25 and 41 and 45 are bolt holes used to fasten a manifold to the bearing blocks. The manifold supplies high pressure fluid to hole 24 which is connected to hole 32 in the compensator. Fluid flows across the compensation lands 33 and into the groove 34 and into hole 35 which is connected to hole 23 which is ported to hole 42 on bearing 40 by a manifold that is not shown here for clarity. Reciprocally, hole 43 is ported to hole 22 by manifold means. The fluid from the compensator on bearing pad 40 is thus directed into the opposed bearing pocket 27 via hole 28.

Figure 2:
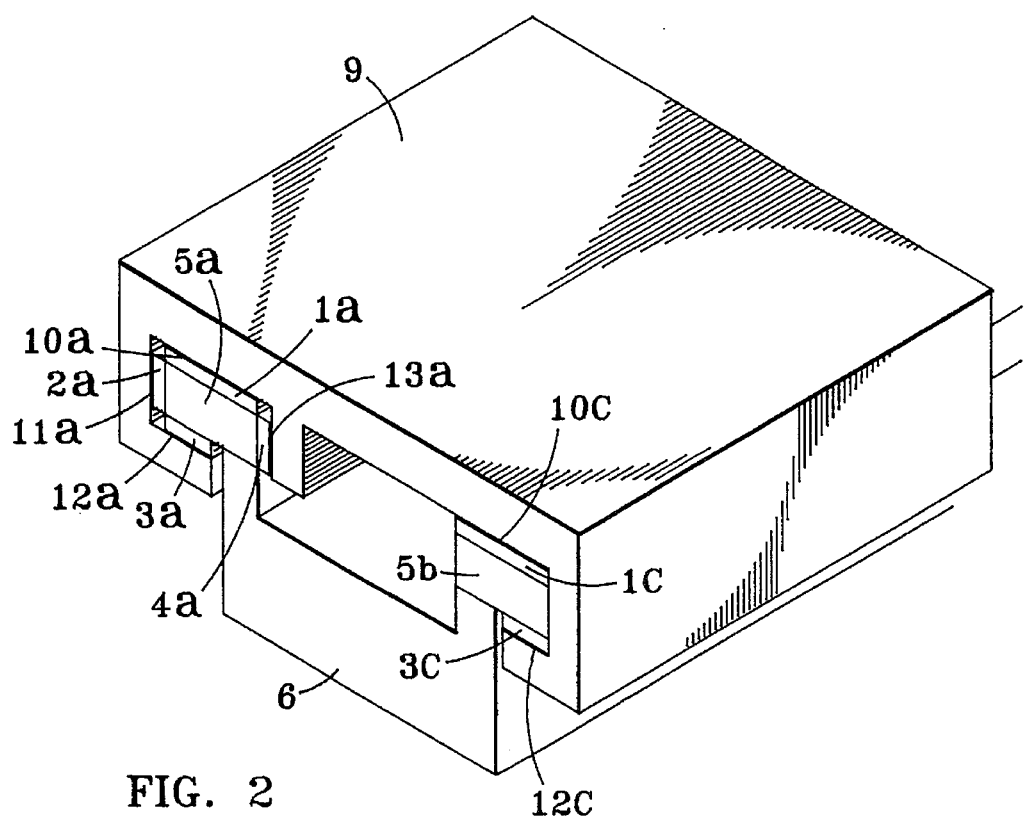
FIG. 2 is an isometric view of a typical bearing rail system with modular bearing pads held to the rails by vacuum means and the carriage positioned over the system after injection of the epoxy.

For the novel manufacturing procedure that is described herein, holes 22 and 42 are connected to a vacuum that pulls the bearings pads down flat onto the bearing rail. Hole 45 could be connected to a pocket 49 on the backside of the bearing (or the bearing back could be flat) by a hole 50. Epoxy is then be injected between the bearing pad and the carriage. The resulting assembly is shown in FIG. 2. The epoxy layers visible are 10a, 11a, 12a, 13a, and 14a, for securing bearings pads 1a, 2a, 3a, and 4a, respectively, to the carriage 9; and 10c and 12c for securing bearing pads 1c and 3c respectively.

Figure 4:
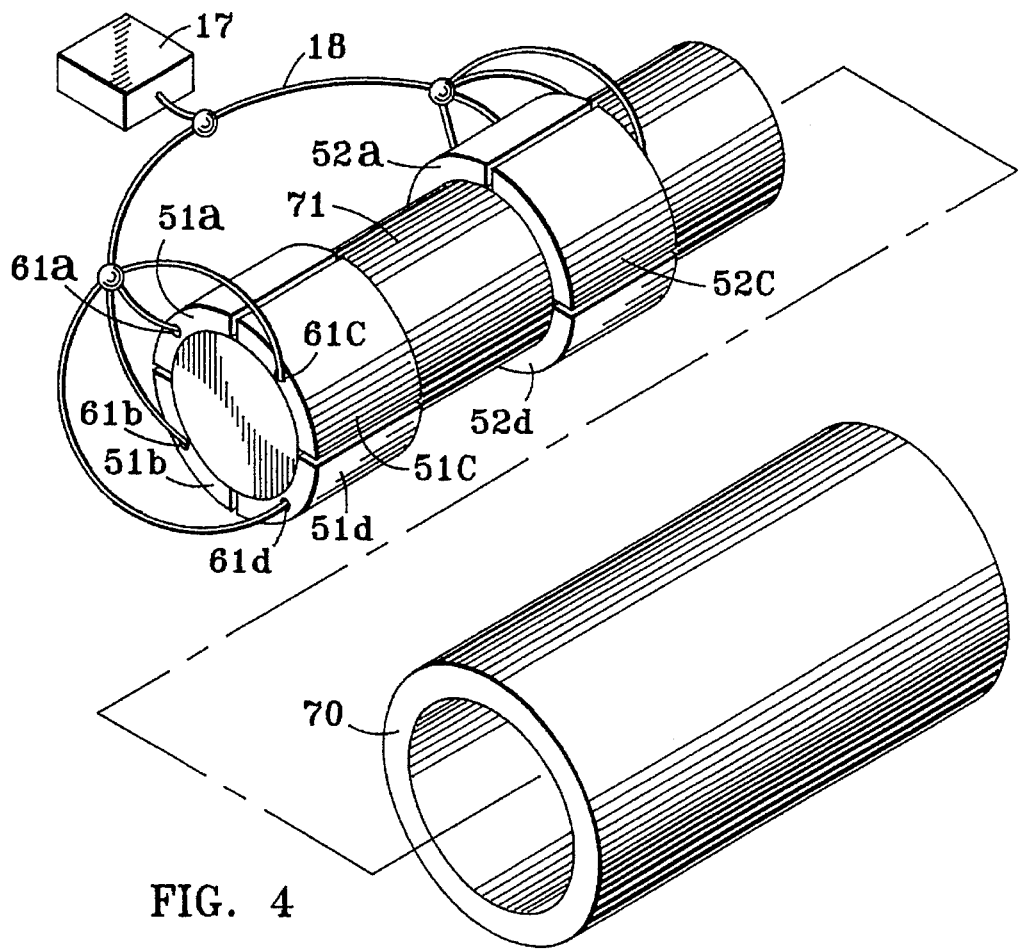
FIG. 4 is an isometric view of a spindle shaft with modular bearing pads held to the shaft by vacuum means prior to the housing being positioned over the system and injection of the epoxy.
Figure 5:
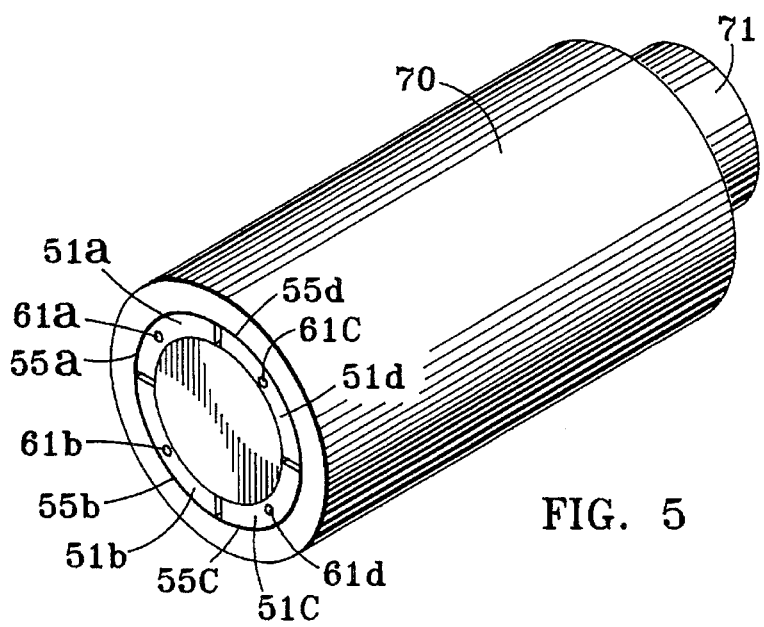
FIG. 5 of a spindle shaft with modular bearing pads held to the shaft by vacuum means and the housing positioned over the system after injection of the epoxy.

For application to rotary motion systems such as, for example those of U.S. Pat. No. 5,281,032 of common assignee herewith, FIG. 4 shows a shaft 71 with precision bearing units 51a, 51b, 51c, and 51d and 52a, 52b, 52c, and 52d. These sections are held to the shaft 71 by vacuum through ports such as 61a, 61b, 61c, and 61d that are connected internally to the bearing surfaces which are facing the shaft 71. FIG. 5 shows the completed assembly, where the housing 70 is now fixed to the bearing pads via a layer of epoxy, such as pads 51a, 51b, 51c, and 51d and epoxy layers 55a, 55b, 55c, and 55d.

In summary, therefore, the invention involves a method for manufacturing a precision linear or rotary motion system that is comprised of one or a set of precision machine bearing rails (i.e., long straight and parallel surfaces, or a single straight shaft), precision manufactured modular bearing pads, and a carriage or housing that surrounds the bearing pads when they are placed onto the rails and held in place by placing a vacuum on the port normally used to supply pressurized lubricant to the bearing rails, leaving a gap between the rough surface of the housing or the carriage and the backsides of the bearing pads, into which a stable epoxy is injected to fill the gap between the backs of the bearing pads and the inner rough surface of the carriage. These goals are achieved first by designing the bearing rails or shaft to have the required straightness and parallelism tolerance, and the carriage or housing to have the required stiffness, such that when the bearing pads are epoxy-potted in-place and the external pressure source for the lubricant is turned on, the system expands enough to provide a sufficient and even fluid or gas film between the bearing pad surface and the rails or shaft as the carriage or housing moves through its complete range of motion with respect to the shaft. Alternatively, thin shim stock with holes in it (e.g., 10 micron thick) can be placed between one or more of the bearing pads and the rail prior to turning on the vacuum. After the epoxy is injected and cured, the shim stock is easily removed when the pressure is turned on.

The bearing and carriage may be of various materials, including metal, porous graphite, polymers, and ceramics, among others and the bearing fluid may be liquid or gaseous, including water and air. Further modifications of the invention will also occur to persons skilled in the art, and all such are deemed to fall within the spirit and scope of the invention as defined by the appended claims.

What is claimed is:

1. A method for manufacturing a precision linear or rotary motion system using pressurized fluid bearings and comprised of one or a set of precision machine bearing rails and having a predetermined region where the pressurized fluid is normally applied to the bearing rails, precision manufactured modular bearing pads and a carriage/housing with rough inner surfaces that surround the bearing pads as placed on the rails, that comprises putting the bearing pads in place inner side down on the rails; applying vacuum only between pads and rails at said predetermined region to hold the bearing pads flat in their desired places while leaving a gap between rough surfaces of the carriage/housing and the outer sides of the bearing pads; injecting a stable epoxy to fill said gap between the outer sides of the bearing pads and the inner rough surfaces of the carriage to pot the bearing pads in precisely aligned place; and withdrawing the vacuum and applying the pressurized bearing fluid between the inner sides of the bearing pads and the rails to provide an operating fluid film therebetween.

2. A method as claimed in claim 1 and in which the bearing pads are fluid self-compensating and the fluid is water.

3. A method as claimed in claim 1 and in which the bearing pads comprise porous graphite and the fluid is air.

4. A method as claimed in claim 1 and in which the bearing pads use pockets and a fluid flow regulation device to regulate the flow into the pockets.

* * * * *